(12) United States Patent
Lee et al.

(10) Patent No.: US 10,845,232 B2
(45) Date of Patent: Nov. 24, 2020

(54) MASS FLOW CONTROLLER, APPARATUS FOR MANUFACTURING SEMICONDUCTOR DEVICE, AND METHOD FOR MAINTENANCE THEREOF

(71) Applicant: Samsung Electronics Co., Ltd., Suwon-si (KR)

(72) Inventors: Sangkil Lee, Yongin-si (KR); Yusin Yang, Seoul (KR); Sung Yoon Ryu, Suwon-si (KR); Q-Han Park, Seoul (KR); Hyun Lee, Hwaseong-si (KR)

(73) Assignee: Samsung Electronics Co., Ltd.

( * ) Notice: Subject to any disclaimer, the term of this patent is extended or adjusted under 35 U.S.C. 154(b) by 296 days.

(21) Appl. No.: 16/013,199

(22) Filed: Jun. 20, 2018

(65) Prior Publication Data
US 2019/0170563 A1    Jun. 6, 2019

(30) Foreign Application Priority Data

Dec. 1, 2017 (KR) .................... 10-2017-0164431

(51) Int. Cl.
*G01F 25/00* (2006.01)
*G01F 15/02* (2006.01)

(52) U.S. Cl.
CPC .......... *G01F 25/0038* (2013.01); *G01F 15/02* (2013.01)

(58) Field of Classification Search
CPC .. G01F 25/0038; G01F 25/0053; G01F 15/02; G01F 15/04; G05D 7/0635
See application file for complete search history.

(56) References Cited

U.S. PATENT DOCUMENTS

| | | | |
|---|---|---|---|
| 5,684,245 A | 11/1997 | Hinkle | |
| 5,948,958 A | 9/1999 | Bang et al. | |
| 6,955,072 B2 | 10/2005 | Zarkar et al. | |
| 7,510,884 B2 | 3/2009 | Okabe et al. | |
| 7,716,993 B2 | 5/2010 | Ozawa et al. | |
| 8,521,461 B2 | 8/2013 | Shareef et al. | |
| 9,057,636 B2 | 6/2015 | Nagai | |
| 9,169,975 B2 | 10/2015 | Sarin et al. | |
| 9,256,228 B2 | 2/2016 | Smirnov et al. | |
| 2002/0083705 A1* | 7/2002 | Bigo | F03C 1/0431 60/464 |
| 2004/0250600 A1 | 12/2004 | Bevers et al. | |
| 2006/0116808 A1* | 6/2006 | Tanaka | F02D 41/18 701/102 |
| 2014/0083514 A1* | 3/2014 | Ding | G01F 1/363 137/12 |

FOREIGN PATENT DOCUMENTS

JP         H07134052         5/1995

* cited by examiner

*Primary Examiner* — Suman K Nath
(74) *Attorney, Agent, or Firm* — Myers Bigel, P.A.

(57) ABSTRACT

Disclosed are mass flow controllers, apparatuses for manufacturing semiconductor devices, and methods of maintenance thereof. The mass flow controller may control an amount of a gas provided into a chamber. The mass flow controller may be configured to obtain an absolute volume of the gas provided into the chamber at a standard flow rate when the mass flow controller is initially used. The mass flow controller may be configured to obtain a detected flow rate of the gas provided at a measured flow rate after the mass flow controller has been used for a predetermined time. The mass flow controller may be configured to compare the detected flow rate and the standard flow rate to verify a full-scale error in the measured flow rate.

20 Claims, 5 Drawing Sheets

MASS FLOW CONTROLLER, APPARATUS FOR MANUFACTURING SEMICONDUCTOR DEVICE, AND METHOD FOR MAINTENANCE THEREOF

CROSS-REFERENCE TO RELATED APPLICATIONS

This U.S. nonprovisional application claims priority under 35 U.S.C § 119 to Korean Patent Application No. 10-2017-0164431, filed on Dec. 1, 2017 in the Korean Intellectual Property Office, the entire contents of which are hereby incorporated by reference herein.

BACKGROUND

Inventive concepts relate to a mass flow controller, an apparatus for manufacturing a semiconductor device, and a method for maintenance thereof.

In general, a semiconductor device may be manufactured by a thin-film deposition process, a photolithography process, and an etching process. The thin-film deposition process and the etching process may use various kinds of gases. The gases may be provided onto a substrate placed in a chamber. A mass flow controller may primarily control the flow of the gases. Accuracy of the mass flow controller may decrease in inverse proportion to a use time of the mass flow controller.

SUMMARY

Some embodiments of inventive concepts provide an apparatus for manufacturing a semiconductor device and a method for maintenance thereof in which a mass flow controller is capable of being periodically verified.

Some embodiments of inventive concepts provide an apparatus for manufacturing a semiconductor device and a method for maintenance thereof in which a mass flow controller is capable of being calibrated.

According to example embodiments of inventive concepts, a mass flow controller may control an amount of a gas provided into a chamber. The mass flow controller may be configured to obtain an absolute volume of the gas provided into the chamber at a standard flow rate when the mass flow controller is initially used. The mass flow controller may be configured to obtain a detected flow rate of the gas provided at a measured flow rate after the mass flow controller has been used for a predetermined time. The mass flow controller may be configured to compare the detected flow rate and the standard flow rate to verify a full-scale error in the measured flow rate.

According to example embodiments of inventive concepts, an apparatus for manufacturing a semiconductor device may include: a chamber; first and second mass flow controllers that are each configured to provide a gas into the chamber; and a controller electrically connected to the first and second mass flow controllers. The controller may be configured to determine an absolute volume of the gas provided into the chamber at a standard flow rate of the first mass flow controller. The controller may be configured to determine a detected flow rate of the gas provided at a measured flow rate of the second mass flow controller. The controller may be configured to compare the detected flow rate with the standard flow rate to verify a full-scale error in the measured flow rate.

According to example embodiments of inventive concepts, a method for maintenance of an apparatus for manufacturing a semiconductor device may include: using a standard flow rate of a mass flow controller to obtain an absolute volume of a gas in a chamber; and periodically verifying a full-scale error in a measured flow rate of the mass flow controller using the absolute volume. The step of periodically verifying the full-scale error in the measured flow rate may include: providing the chamber with the gas at the measured flow rate; determining a detected flow rate of the mass flow controller based on the absolute volume; and comparing the detected flow rate with the standard flow rate to obtain the full-scale error in the measured flow rate.

DETAILED DESCRIPTION OF EMBODIMENTS

As used herein the expression "and/or" includes any and all combinations of one or more of the associated listed items.

Figure 1:
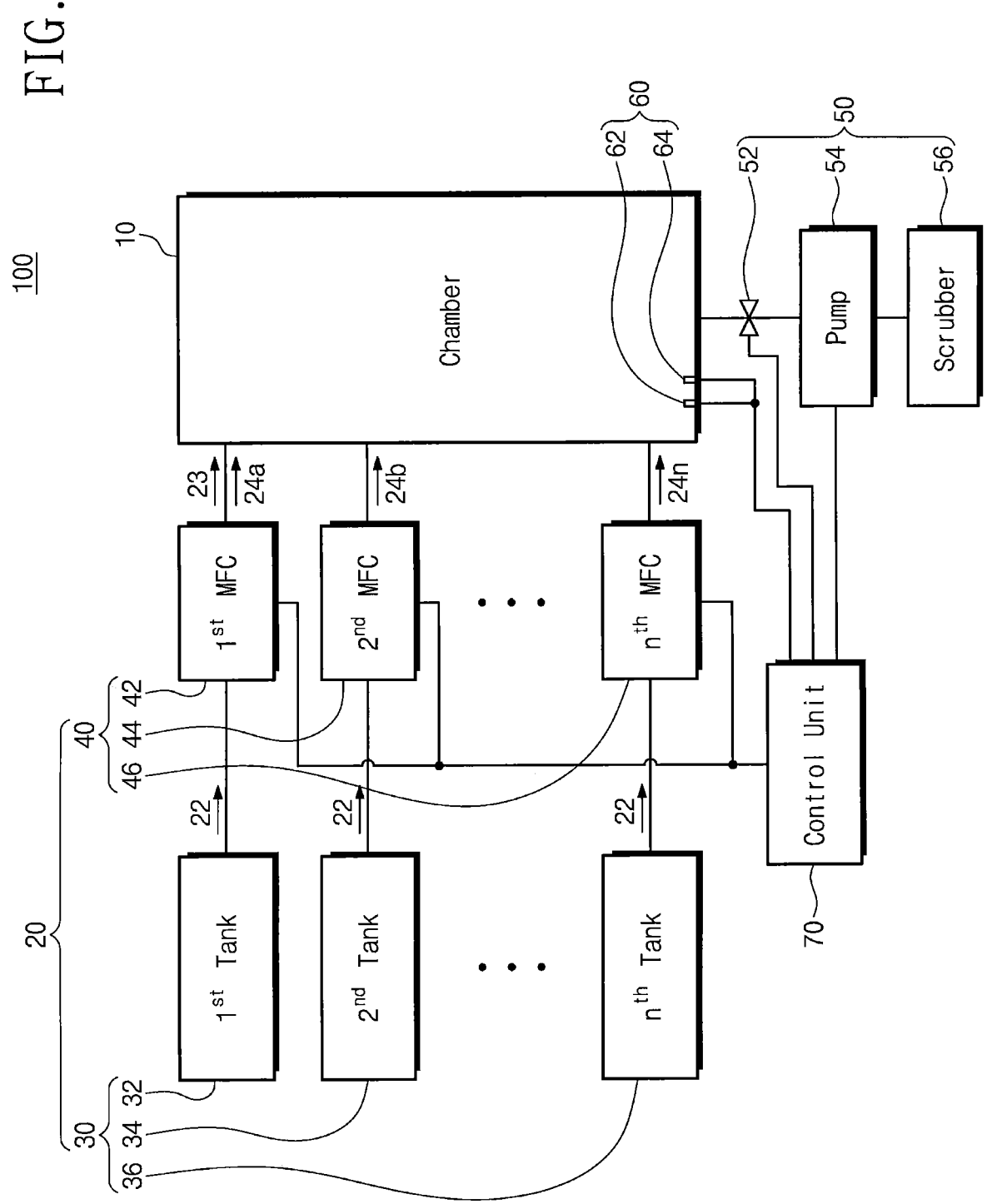
FIG. 1 illustrates a schematic diagram showing an apparatus for manufacturing a semiconductor device, according to example embodiments of inventive concepts.

FIG. 1 shows an apparatus 100 for manufacturing a semiconductor device, according to inventive concepts.

Referring to FIG. 1, the semiconductor manufacturing apparatus 100 may be configured to perform thin-film deposition, etching, heat treatment, diffusion, or ion implantation. In an embodiment, the semiconductor manufacturing apparatus 100 may include a chamber 10, a gas supply unit or gas supply system 20, a gas exhaust unit or gas exhaust system 50, sensors 60, and a control unit or controller 70.

The chamber 10 may provide a substrate (e.g., a silicon wafer or a glass) with an isolated space from the outside.

The gas supply unit 20 may be engaged with the chamber 10. The gas supply unit 20 may provide the chamber 10 with gases 22 that are the same as or different from each other. The gases 22 may include a purge gas (e.g., $N_2$), a deposition gas (e.g., $SiH_4$, $NH_3$, $NO_2$, $O_3$, TEOS), an etching gas (e.g., $SF_6$, HF, $CH_3$, $CH_4$, HCl, HBr, $H_2SO_4$, $H_2$), or an inert gas (e.g., Ar, He). The gases 22 may have different temperatures depending on their kind or type. For example, the purge gas may have room temperature (e.g., about 20° C.). One or more of the deposition gas and the etching gas may have a temperature (e.g., about 50° C. to about 200° C.) higher than that of the purge gas. In an embodiment, the gas supply unit 20 may include tanks 30 and mass flow controllers (MFCs) 40.

The tanks 30 may store the gases 22 at different temperatures and pressures from each other. The tanks 30 may include first to $n^{th}$ tanks 32 and 34 to 36.

The MFCs 40 may be disposed between the chamber 10 and their corresponding tanks 30. The MFCs 40 may control flow rates and/or flow amounts of the gases 22. In an embodiment, the MFCs 40 may include first to $n^{th}$ MFCs 42 and 44 to 46.

The first MFC 42 may control the flow amount of the gas 22 that is intended to be provided into the chamber 10. In an embodiment, the first MFC 42 may be a new MFC and/or a reference MFC. When the first MFC 42 is initially used, the first MFC 42 may provide the chamber 10 with the gas 22 at a standard flow rate 23. As the first MFC 42 is used over time, the first MFC 42 may provide the chamber 10 with the gas 22 at a first measured flow rate 24a. It may be theoretically expected that the first measured flow rate 24a is consistent with the standard flow rate 23, but the first measured flow rate 24a may fluctuate over time as the first MFC 42 is used. For example, the first measured flow rate 24a may be consistent with the standard flow rate 23 when the first MFC 42 is initially used, but may become different from the standard flow rate 23 after the first MFC 42 is used for a predetermined time.

In an embodiment, the standard flow rate 23 may be used to calculate an absolute volume of the gas 22 in the chamber 10, and the first measured flow rate 24a may be used to establish a detected flow rate of the first MFC 42. For example, after an initial operation and/or preventive maintenance of the semiconductor manufacturing apparatus 100, the standard flow rate 23 may be used to obtain the absolute volume of the gas 22 in the chamber 10. After the first MFC 42 is used, the first measured flow rate 24a may be used to verify and/or calibrate accuracy of the first MFC 42.

Each of the standard flow rate 23 and the first measured flow rate 24a may be expressed by SCCM (Standard Cubic Centimeters per Minute), a gas flow unit. The amount or volume of the gas 22 may be represented by SCCM indicating cm3/min at a standard temperature (e.g., 0° C. or 273 K) and pressure (e.g., 1.01 atm, 1.01 bar, or 14.72 psia). For example, when the volume of the gas 22 is constant, a standard condition for the calculation of SCCM may be defined as the standard temperature. For example, when the first MFC 42 is initially used, the first MFC 42 may provide the chamber 10 with the gas 22 at the standard flow rate 23 of about 270.78 SCCM. When accuracy verification and/or calibration are performed on the first measured flow rate 24a, the first MFC 42 may provide the chamber 10 with the gas 22, based on the standard flow rate 23.

The second to n$^{th}$ MFCs 44 to 46 may be used. The second to n$^{th}$ MFCs 44 to 46 may provide the gases 22 at second to n$^{th}$ measured flow rates 24b to 24n, respectively. Each of the second to n$^{th}$ measured flow rates 24b to 24n may be expressed by SCCM (Standard Cubic Centimeters per Minute). When accuracy verification and/or calibration are performed on the second to n$^{th}$ measured flow rates 24b to 24n, the second to n$^{th}$ MFCs 44 to 46 may provide the chamber 10 with the gases 22, based on the standard flow rate 23.

The gas exhaust unit 50 may be connected to or engaged with the chamber 10. The gas exhaust unit 50 may discharge the gas 22 from the chamber 10. The gas 22 in the gas exhaust unit 50 may include a gas that has been reacted. In an embodiment, the gas exhaust unit 50 may include a valve 52, a pump 54, and a scrubber 56.

The valve 52 may be installed between the chamber 10 and the pump 54. The valve 52 may control an exhaustion or rate of exhaust of the gas 22. In an embodiment, the valve 52 may be closed when accuracy verification and/or calibration are performed on the first to n$^{th}$ measured flow rates 24a to 24n of the first to n$^{th}$ MFCs 42 to 46. Alternatively, the valve 52 may be opened when accuracy verification and/or calibration are performed on the first to n$^{th}$ measured flow rates 24a to 24n.

The pump 54 may be installed between the valve 52 and the scrubber 56. The pump 54 may cause the scrubber 56 to receive the gas 22 that is pumped at a predetermined pump pressure.

The scrubber 56 may regenerate and/or exhaust the gas 22. For example, the gas 22 may be filtered through water or solvent in the scrubber 56, and then discharged from the scrubber 56 to the atmosphere.

The sensors 60 may be disposed in the chamber 10. The sensors 60 may detect pressure and temperature of the gas 22 in the chamber 10. The sensors 60 may include a first sensor 62 and a second sensor 64. The first sensor 62 may be or include a temperature sensor. The second sensor 64 may be or include a pressure sensor.

The control unit 70 may be placed outside the chamber 10. The control unit 70 may be connected (e.g., communicatively connected) to the MFCs 40, the valve 52, the pump 54, and the first and second sensors 62 and 64. The control unit 70 may communicate with the MFCs 40, the valve 52, the pump 54, and/or the first and second sensors 62 and 64 via a wired connection or a wireless connection. The control unit 70 may receive detection signals from the first and second sensors 62 and 64, and then discriminate and/or determine temperature and/or pressure of the gas 22 in the chamber 10. The control unit 70 may control the first to n$^{th}$ MFCs 42 to 46 to adjust the flow amount or flow rate of the gas 22. Although not shown, the control unit 70 may be disposed on one of the first to n$^{th}$ MFCs 42 to 46. One of the first to n$^{th}$ MFCs 42 to 46 may include the control unit or controller 70. Each of the first to n$^{th}$ MFCs 42 to 46 may include one of the control units or controllers 70.

The chamber 10 may vary in pressure when the gas 22 is supplied thereto, and when the valve 52 is closed, the control unit 70 may detect the variation in pressure of the chamber 10. In an embodiment, the control unit 70 may use the first MFC 42 to obtain the absolute volume of the gas 22 in the chamber 10. The absolute volume may be calculated by Mathematical Equation 1.

$$V = Q_s \bigg/ \left[ \frac{dP}{dt} \frac{Tr}{T} \right] \qquad \text{[Mathematical Equation 1]}$$

In Mathematical Equation 1, V may be the absolute volume, Qs may be a standard flow rate of the gas 22, dP/dt may be a variation in pressure per unit time of the gas 22 in the chamber 10, and Tr/T may be a standardized temperature. The absolute volume V may change depending on a size of the chamber 10. When the chamber 10 is used in an etching process, the pressure variation dP/dt may be balanced with a variation in outgassing pressure of the gas 22 at an inner wall of the chamber 10. The standardized temperature Tr/T may be obtained when an absolute temperature Tr in Kelvin converted from the standard temperature in centigrade (e.g., 0° C.) is divided by an absolute temperature T in Kelvin converted from a measured temperature in centigrade of the gas 22. The standardized temperature Tr/T may standardize the temperature of the gas 22 with respect to the standard temperature. In an embodiment, the absolute volume V may be obtained when the standard flow rate Qs is divided by the pressure variation dP/dt and the standardized temperature Tr/T. For example, unless the chamber 10 is changed in size and/or configuration, the absolute volume V may maintain constant regardless of the temperature of the gas 22. The absolute volume V may be changed when the chamber 10 is initially set up and/or is under preventive maintenance.

The control unit 70 may use the absolute volume V and the first to $n^{th}$ measured flow rates 24a to 24n corresponding to the standard flow rate 23, thereby obtaining a detected flow rate. For example, when the valve 52 is closed, the control unit 70 may use Mathematical Equation 2 to obtain a detected flow rate of each of the first to $n^{th}$ MFCs 42 to 46.

$$Q_c = V\left[\frac{dP}{dt}\right]\left[\frac{Tr}{T}\right] \quad \text{[Mathematical Equation 2]}$$

In Mathematical Equation 2, Qc may be the detected flow rate. In an embodiment, the detected flow rate Qc may be expressed by SCCM. When the first to $n^{th}$ measured flow rates 24a to 24n are set up as the standard flow rate 23, the control unit 70 may obtain the detected flow rate Qc of each of the first to $n^{th}$ MFCs 42 to 46. In an embodiment, the detected flow rate Qc may be obtained when the absolute volume V is multiplied by the pressure variation dP/dt and the standardized temperature Tr/T.

Alternatively, when the valve 52 is open or opened, the control unit 70 may use Mathematical Equation 3 to obtain a detected flow rate of each of the first to $n^{th}$ MFCs 42 to 46.

$$Q_c = SP\left[\frac{Tr}{T}\right] \quad \text{[Mathematical Equation 3]}$$

In Mathematical Equation 3, S may be a pumping rate or speed of the pump 54, and P may be a pressure of the gas 22 in the chamber 10. The pumping speed of the pump 54 may be measured at a position of the valve 52 below the chamber 10. As discussed above, when the first to $n^{th}$ measured flow rates 24a to 24n are set up as the standard flow rate 23, the control unit 70 may obtain the detected flow rate Qc of each of the first to $n^{th}$ MFCs 42 to 46. In an embodiment, the detected flow rate Qc may be obtained when the pumping speed S is multiplied by the pressure P of the gas 22 and the standardized temperature Tr/T. When the pumping speed S and the standardized temperature Tr/T are determined, the detected flow rate Qc may increase in proportion to the pressure P of the gas 22.

The control unit 70 may compare the detected flow rate Qc with the standard flow rate 23 to verify accuracy and/or full-scale error in each of the first to $n^{th}$ measured flow rates 24a to 24n. When the full-scale error is greater than a threshold value, the control unit 70 may use the detected flow rate Qc to calibrate each of the first to $n^{th}$ measured flow rates 24a to 24n. It will be discussed in detail below the calibration and/or full-scale error verification in the first to $n^{th}$ measured flow rates 24a to 24c of the first to $n^{th}$ MFCs 42 to 46.

The following describes a method for maintenance of the semiconductor manufacturing apparatus 100, according to inventive concepts.

Figure 2:
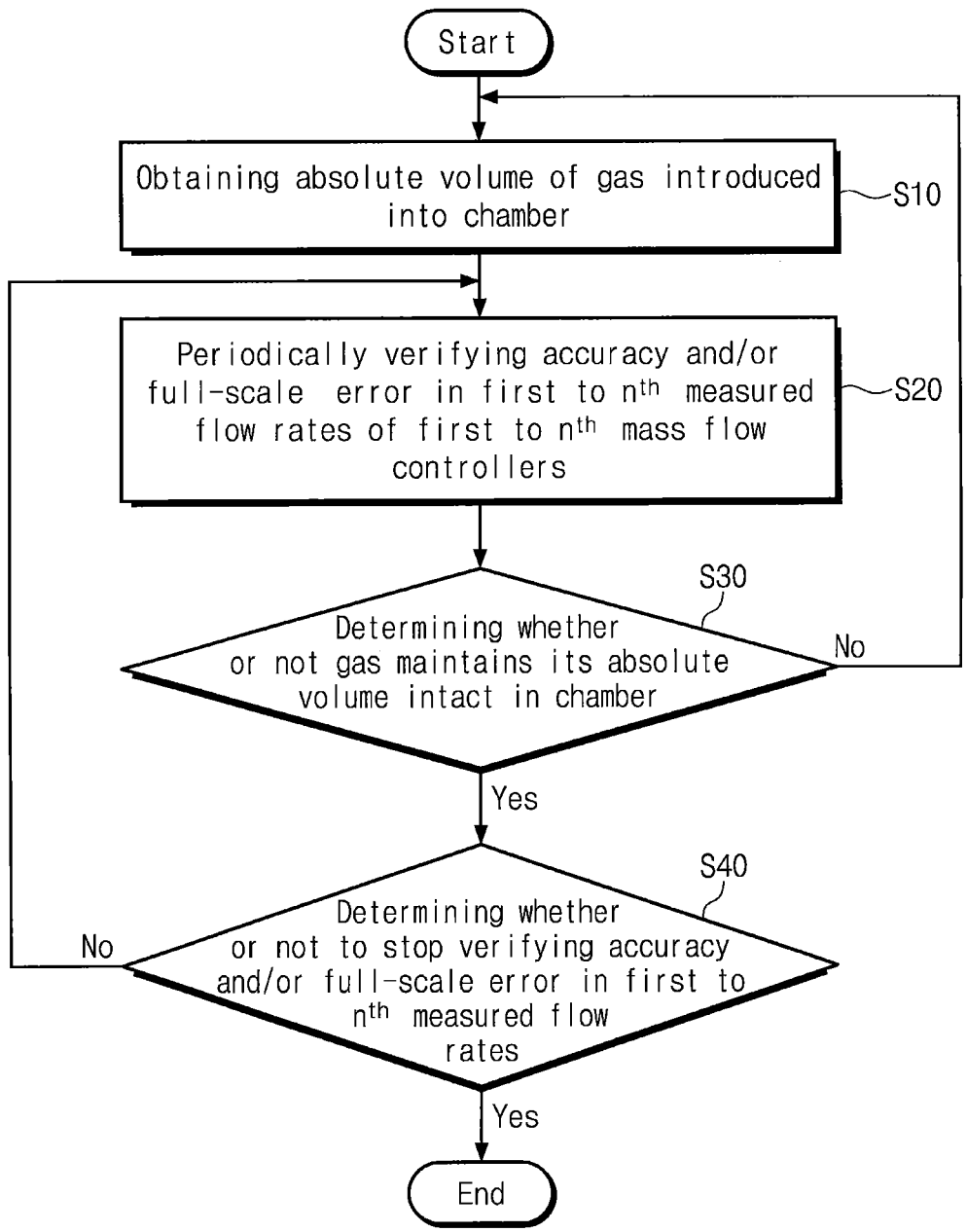
FIG. 2 illustrates a flow chart showing a method for maintenance of the semiconductor manufacturing apparatus of FIG. 1.

FIG. 2 shows a method for maintenance of the semiconductor manufacturing apparatus 100 of FIG. 1.

Referring to FIG. 2, the method for maintenance of the semiconductor manufacturing apparatus 100 may be a method for calibration and/or full-scale error verification in the first to $n^{th}$ measured flow rates 24a to 24n of the first to $n^{th}$ MFCs 42 to 46. In an embodiment, the method for maintenance of the semiconductor manufacturing apparatus 100 may include a step S10 of using the standard flow rate 23 to obtain the absolute volume V of the gas 22 provided in the chamber 10, a step S20 of periodically verifying accuracy and/or full-scale error in the first to $n^{th}$ measured flow rates 24a to 24n of the first to $n^{th}$ MFCs 42 to 46, a step S30 of determining whether or not the gas 22 maintains its absolute volume V constant or intact in the chamber 10, and a step S40 of determining whether or not to stop accuracy and/or full-scale error verification of the first to $n^{th}$ measured flow rates 24a to 24n.

The control unit 70 may use the standard flow rate 23 or the first measured flow rate 24a of the first MFC 42 to obtain the absolute volume V of the gas 22 provided in the chamber 10 (S10). The absolute volume V may be calculated by Mathematical Equation 1.

Figure 3:
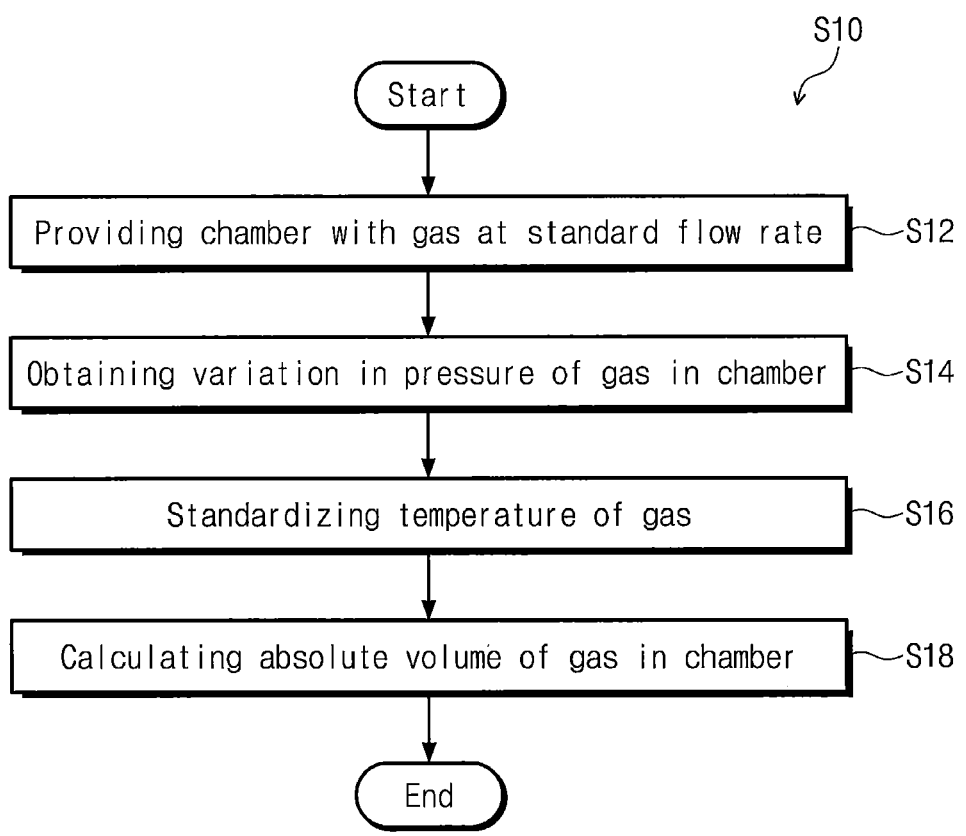
FIG. 3 illustrates a flow chart showing an example of an absolute volume calculation step of FIG. 2.

FIG. 3 shows an example of the absolute volume calculation step S10 of FIG. 2.

Referring to FIG. 3, the step S10 of calculating the absolute volume V may include a step S12 of providing the chamber 10 with the gas 22 at the standard flow rate 23, a step S14 of obtaining the pressure variation dP/dt of the gas 22 in the chamber 10, a step S16 of standardizing the temperature of the gas 22 in the chamber 10, and a step S18 of calculating the absolute volume V of the gas 22 in the chamber 10.

The first MFC 42 may provide the chamber 10 with the gas 22 at the standard flow rate 23 (S12). When the valve 52 is closed, the gas 22 may be provided into the chamber 10. For example, the first MFC 42 may provide the chamber 10 with the gas 22 at the standard flow rate 23 of about 270.78 SCCM.

The control unit 70 may obtain or determine the pressure variation dP/dt of the gas 22 in the chamber 10 (S14). When the second sensor 64 detects the pressure of the gas 22 in the chamber 10, the control unit 70 may calculate and/or detect the pressure variation dP/dt caused by the gas 22 in the chamber 10. For example, when a pressure of the chamber 10 is changed from about 12.21 mbar to about 15.02 mbar during the time period of about 500 seconds, the control unit 70 may obtain the pressure variation dP/dt of about 0.00566 mbar/sec. When the chamber 10 is used in an etching process, the pressure of the chamber 10 may increase due to a variation in outgassing pressure of about $1.2343 \times 10^{-5}$ mbar/sec. As a result, the pressure variation dP/dt may be balanced as much as the variation in outgassing pressure. For example, the pressure variation dP/dt may be calculated to be about 0.00033443 atm/min (0.0056477 mbar/sec=0.00566 mbar/sec−0.000012343 mbar/sec).

The control unit 70 may standardize the temperature of the gas 22 (S16). When the first sensor 62 detects the temperature of the gas 22 in the chamber 10, the control unit 70 may obtain or determine the standardized temperature Tr/T of the gas 22. For example, when the temperature of the gas 22 is about 22.1° C., the standardized temperature Tr/T may be calculated to be about 0.92515 (273.15 K/(273.15+22.1) K).

The control unit 70 may calculate the absolute volume V (S18). The control unit 70 may apply the standard flow rate Qs, the pressure variation dP/dt, and the standardized temperature Tr/T to Mathematical Equation 1, which calculation may yield the absolute volume V. For example, the absolute volume V may be calculated to be about 875190 cubic centimeters (cc) (270.78/(0.00033443×0.92515)).

Referring back to FIG. 2, the control unit 70 may use the standard flow rate 23 and the absolute volume V to periodically verify accuracy and/or full-scale error in the first to $n^{th}$ measured flow rates 24a to 24n of the first to $n^{th}$ MFCs 42 to 46 (S20).

Figure 4:
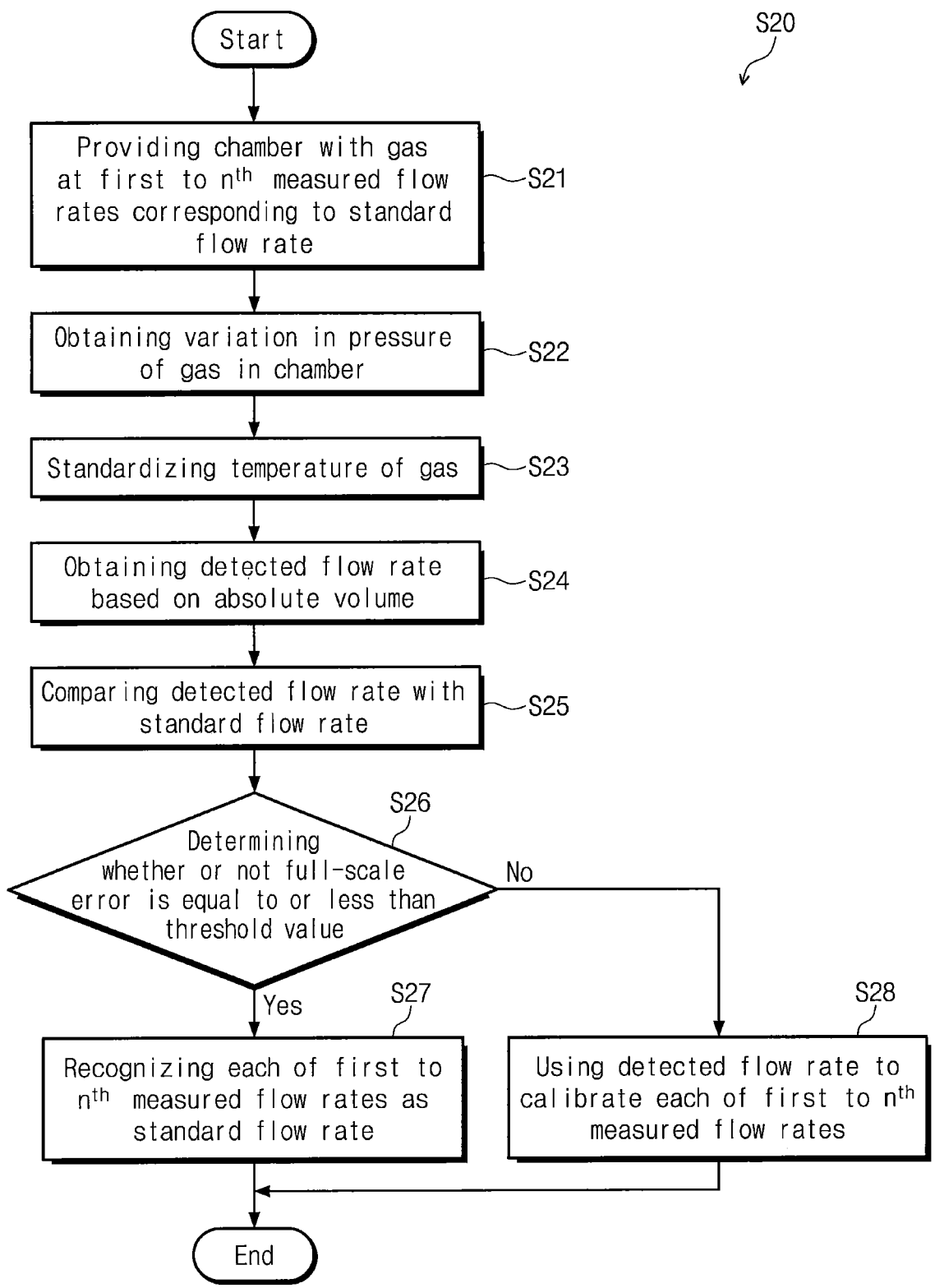
FIG. 4 illustrates a flow chart showing an example of a step of verifying accuracy and/or full-scale error in first to $n^{th}$ measured flow rates of first to $n^{th}$ mass flow controllers shown in FIG. 2.

FIG. 4 shows an example of the step S20 of verifying accuracy and/or full-scale error in the first to $n^{th}$ measured flow rates 24a to 24n of the first to $n^{th}$ MFCs 42 to 46.

Referring to FIG. 4, the step S20 of verifying accuracy and/or full-scale error in the first to $n^{th}$ measured flow rates 24a to 24n of the first to $n^{th}$ MFCs 42 to 46 may include a step S21 of providing the chamber 10 with the gas 22 at the first to $n^{th}$ measured flow rates 24a to 24n corresponding to the standard flow rate 23, a step S22 of obtaining the pressure variation dP/dt of the gas 22 in the chamber 10, a step S23 of standardizing the temperature of the gas 22 in the chamber 10, a step S24 of obtaining the detected flow rate Qc of each of the first to $n^{th}$ MFCs 42 to 46 on the basis of the absolute volume V, a step S25 of comparing the detected flow rate Qc with the standard flow rate 23, a step S26 of determining whether or not a full-scale error calculated from a difference between the detected flow rate Qc and the standard flow rate 23 is equal to or less than the threshold value, a step S27 of implementing, recognizing, or using each of the first to $n^{th}$ measured flow rates 24a to 24n as the standard flow rate 23 when it is determined that the full-scale error is equal to or less than the threshold value, and a step S28 of using the detected flow rate Qc to calibrate each of the first to $n^{th}$ measured flow rates 24a to 24n when it is determined that the full-scale error is greater than the threshold value. It will be appreciated that the method may include implementing, recognizing, or using each of the first to $n^{th}$ measured flow rates 24a to 24n as the standard flow rate 23 when it is determined that the full-scale error is less than the threshold value, and using the detected flow rate Qc to calibrate each of the first to $n^{th}$ measured flow rates 24a to 24n when it is determined that the full-scale error is equal to or greater than the threshold value.

The first to $n^{th}$ MFCs 42 to 46 may provide the chamber 10 with the gas 22 at the first to $n^{th}$ measured flow rates 24a to 24n that are the same as the standard flow rate 23 (S21). For example, when the valve 52 is closed, and when the standard flow rate 23 is about 28.93 SCCM, the first MFC 42 may provide the chamber 10 with the gas 22 at the first measured flow rate 24a of about 28.93 SCCM.

The control unit 70 may obtain or determine the pressure variation dP/dt of the gas 22 in the chamber 10 (S22). The control unit 70 may obtain the pressure variation dP/dt of about $3.73 \times 10^{-5}$ atm/min (0.00063 mbar/sec).

The control unit 70 may standardize the temperature of the gas 22 (S23). When the temperature of the gas 22 is about 25.84° C., the standardized temperature Tr/T may be calculated to be about 0.91358.

The control unit 70 may obtain the detected flow rate Qc of each of the first to $n^{th}$ MFCs 42 to 46 based on the absolute volume V (S24). The detected flow rate Qc may be calculated in accordance with Mathematical Equation 2. For example, when the absolute volume V is about 875190 cc, the detected flow rate Qc of the first MFC 42 may be calculated to be about 29.81 SCCM.

The control unit 70 may compare the detected flow rate Qc with the standard flow rate 23 (S25).

Figure 5:
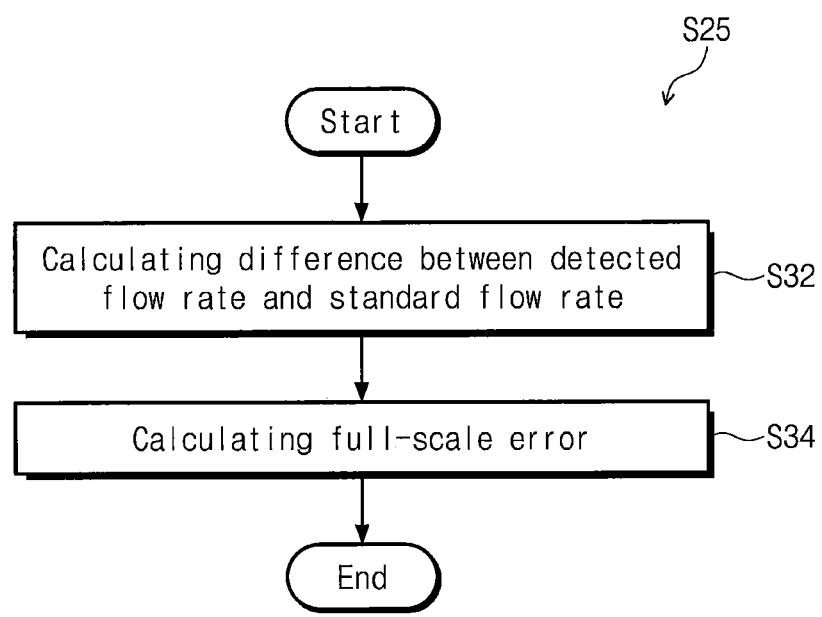
FIG. 5 illustrates a flow chart showing an example of a flow rate comparison step of FIG. 4.

FIG. 5 shows an example of the step S25 of comparing the detected flow rate Qc with the standard flow rate 23.

Referring to FIG. 5, the step S25 of comparing the detected flow rate Qc with the standard flow rate 23 may include a step S32 of calculating a difference between the detected flow rate Qc and the standard flow rate 23, and a step S34 of calculating the full-scale error.

The control unit 70 may deduct or subtract the standard flow rate 23 from the detected flow rate Qc to yield the difference (e.g., absolute value difference) between the detected flow rate Qc and the standard flow rate 23 (S32). For example, when the detected flow rate Qc is about 29.81 SCCM and the standard flow rate 23 is about 28.93 SCCM, the difference between the detected flow rate Qc and the standard flow rate 23 may be calculated to be about 0.88 SCCM.

The control unit 70 may calculate accuracy and/or full-scale error in each of the first to $n^{th}$ measured flow rates 24a to 24n (S34). In an embodiment, the full-scale error may increase in proportion to the difference between the detected flow rate Qc and the standard flow rate 23. The full-scale error may be calculated as a percentage obtained when the difference between the detected flow rate Qc and the standard flow rate 23 is divided by a maximum scale of one of the first to $n^{th}$ MFCs 42 to 46. For example, the full-scale error may be calculated to be about 0.3% when the standard flow rate 23 is about 28.93 SCCM, the difference between the detected flow rate Qc and the standard flow rate 23 is about 0.88 SCCM, and the first MFC 42 has a maximum scale of about 300 SCCM. The full-scale error may be demonstrated on a display apparatus. The accuracy of each of the first to $n^{th}$ MFCs 42 to 46 may be reciprocal to the full-scale error.

Referring back to FIG. 4, the control unit 70 may determine whether or not the full-scale error is equal to or less than the threshold value (S26).

When the full-scale error is equal to or less than the threshold value, the control unit 70 may implement, recognize, or use the first to $n^{th}$ measured flow rates 24a to 24n as the standard flow rate 23 (S27). For example, when the full-scale error is about 0.3%, and when the threshold value is about 0.5%, the control unit 70 may determine that the full-scale error has an acceptable value, and accordingly finish the accuracy and/or full-scale error verification without calibrating the first to $n^{th}$ measured flow rates 24a to 24n.

When the full-scale error is greater than the threshold value, the control unit 70 may use the detected flow rate Qc to calibrate each of the first to $n^{th}$ measured flow rates 24a to 24n (S28). The control unit 70 may determine that the full-scale error has an unacceptable value. The detected flow rate Qc may be used to calibrate each of the first to $n^{th}$ measured flow rates 24a to 24n having the unacceptable values. As a result, a scale of each of the calibrated first to $n^{th}$ measured flow rates 24a to 24n may become the same as a scale of the standard flow rate 23.

Referring back to FIG. 2, after completion of the accuracy and/or full-scale error verification of the first to $n^{th}$ measured flow rates 24a to 24n, the control unit 70 may determine whether or not the gas 22 maintains its absolute volume V intact or constant in the chamber 10 (S30). In an embodiment, the step S30 of determining the intactness or continuity of the absolute volume V may include determining whether or not the chamber 10 has a variation in size. For example, when preventive maintenance is performed on the chamber 10, the absolute volume V may become changed. When the absolute volume V is changed, the control unit 70 may re-execute the steps of S10 to S30.

When the absolute volume V is not changed but remains the same, the control unit 70 may determine whether or not to stop the accuracy and/or full-scale error verification of the first to $n^{th}$ measured flow rates 24a to 24n (S40). When it is required that the accuracy and/or full-scale error be performed on the first to $n^{th}$ measured flow rates 24a to 24n, the control unit 70 may re-execute the steps of S10 to S40.

A semiconductor manufacturing apparatus according to inventive concepts may be provided with a control unit that is configured to obtain an absolute volume of gas provided at a standard flow rate into a chamber when a mass flow controller is initially used, to obtain a detected flow rate of the gas provided at a measured flow rate after the mass flow controller is used, and to compare the detected flow rate with the standard flow rate. The control unit may periodically verify accuracy and/or full-scale error in the measured flow rate, based on the result of the comparison of the standard flow rate and the detected flow rate. When the full-scale error is greater than a threshold value, the control unit may use the detected flow rate to calibrate the measured flow rate.

Example embodiments have been described in the specification and drawings. Although specific terms are used herein, they are merely used for the purpose of describing inventive concepts rather than limiting technical meanings or scopes of inventive concepts disclosed in the claims. Therefore, it will be appreciated by a person of ordinary skill in the art that various modifications and equivalent embodiments can be made from inventive concepts. Therefore, the authentic technical scope of inventive concepts to be protected shall be determined by the technical concepts of the accompanying claims.

What is claimed is:

1. A mass flow controller for controlling an amount of a gas provided into a chamber,
the mass flow controller configured to:
obtain an absolute volume of the gas provided into the chamber at a standard flow rate when the mass flow controller is initially used,
obtain a detected flow rate of the gas used to calibrate a measured flow rate after the mass flow controller has been used for a predetermined time, and
compare the detected flow rate and the standard flow rate to verify an error in the measured flow rate,
wherein the absolute volume is determined by dividing the standard flow rate by both a variation in pressure of the gas in the chamber and a standardized temperature of the gas, and
wherein the detected flow rate is determined by multiplying the absolute volume by both the variation in pressure and the standardized temperature.

2. The mass flow controller of claim 1, wherein the error is compared with a threshold value,
wherein, when the error is greater than the threshold value, the measured flow rate is calibrated by the detected flow rate.

3. The mass flow controller of claim 2, wherein, when the error is equal to or less than the threshold value, the measured flow rate is used as the standard flow rate.

4. The mass flow controller of claim 1, wherein the error is a percentage that is determined by dividing a difference between the detected flow rate and the standard flow rate by a maximum scale of the mass flow controller.

5. The mass flow controller of claim 1, wherein a measured temperature in centigrade of the gas is detected by a first sensor in the chamber, and wherein the standardized temperature is determined by dividing an absolute temperature of zero centigrade by an absolute temperature converted from the measured temperature in centigrade of the gas.

6. The mass flow controller of claim 5, wherein the variation in pressure is detected by a second sensor in the chamber.

7. The mass flow controller of claim 1, wherein, when the chamber is used in an etching process, the variation in pressure is balanced with a variation in outgassing pressure of the gas in the chamber.

8. The mass flow controller of claim 1, wherein the absolute volume and the detected flow rate are obtained when a closing action is performed on a valve that discharges the gas from the chamber.

9. An apparatus for manufacturing a semiconductor device, the apparatus comprising:
a chamber;
first and second mass flow controllers that are each configured to provide a gas into the chamber; and
a controller communicatively connected to the first and second mass flow controllers,
wherein the controller is configured to determine an absolute volume of the gas provided into the chamber at a standard flow rate of the first mass flow controller, to determine a detected flow rate of the gas used to calibrate a measured flow rate of the second mass flow controller, and to compare the detected flow rate with the standard flow rate to verify an error in the measured flow rate, and
wherein the controller is configured to determine the absolute volume using a standardized temperature, a variation in pressure, and the standard flow rate of the gas, and to determine the detected flow rate using the absolute volume, the variation in pressure, and the standardized temperature.

10. The apparatus of claim 9, further comprising first and second sensors that respectively are configured to detect a temperature and a pressure of the gas in the chamber.

11. The apparatus of claim 10, further comprising a gas exhaust system that is configured to discharge the gas from the chamber,
wherein the gas exhaust system comprises:
a pump; and
a valve between the pump and the chamber,
wherein the valve is closed when the absolute volume is determined.

12. The apparatus of claim 11, wherein, when the valve is closed, the controller operates such that the detected flow rate is determined as a mathematical product of the absolute volume, the variation in pressure, and the standardized temperature.

13. The apparatus of claim 9, wherein the error is compared with a threshold value,
wherein, when the error is greater than the threshold value, the detected flow rate is used to calibrate the measured flow rate.

14. The apparatus of claim 13, wherein, when the error is equal to or less than the threshold value, the measured flow rate is used as the standard flow rate.

15. The apparatus of claim 9, wherein the absolute volume is determined by dividing the standard flow rate by both a variation in pressure of the gas in the chamber and a standardized temperature of the gas.

16. A method for maintenance of an apparatus for manufacturing a semiconductor device, the method comprising:
using a standard flow rate of a mass flow controller to obtain an absolute volume of a gas in a chamber; and
periodically verifying an error in a measured flow rate of the mass flow controller using the absolute volume,
wherein periodically verifying the error in the measured flow rate comprises:
providing the chamber with the gas at the measured flow rate;
determining a detected flow rate used to calibrate the measured flow rate of the mass flow controller based on the absolute volume; and
comparing the detected flow rate with the standard flow rate to obtain the error in the measured flow rate, wherein the absolute volume is determined by dividing the standard flow rate by both a variation in pressure of the gas in the chamber and a standardized temperature of the gas, and wherein the detected flow rate is determined by multiplying the absolute volume by both the variation in pressure and the standardized temperature.

17. The method of claim 16, wherein periodically verifying the error in the measured flow rate further comprises:

determining whether or not the error is equal to or less than a threshold value; and when the error is greater than the threshold value, using the detected flow rate to calibrate the measured flow rate.

18. The method of claim 17, wherein, when the full scale error is equal to or less than the threshold value, implementing the measured flow rate as the standard flow rate.

19. The method of claim 16, wherein periodically verifying the error in the measured flow rate further comprises:

determining the variation in pressure of the gas in the chamber; and determining the standardized temperature of the gas by dividing an absolute temperature converted from a standard temperature in centigrade by a measured temperature of the gas in the chamber, wherein the detected flow rate is obtained as a mathematical product of the absolute volume, the variation in pressure, and the standardized temperature.

20. The method of claim 19, wherein the absolute volume is determined by dividing the standard flow rate by both the variation in pressure at an initial time-in-use of the mass flow controller and by the standardized temperature.

* * * * *